Nov. 25, 1930.  J. FARLEY  1,782,605
TRANSMISSION MECHANISM
Filed April 14, 1927  2 Sheets-Sheet 1
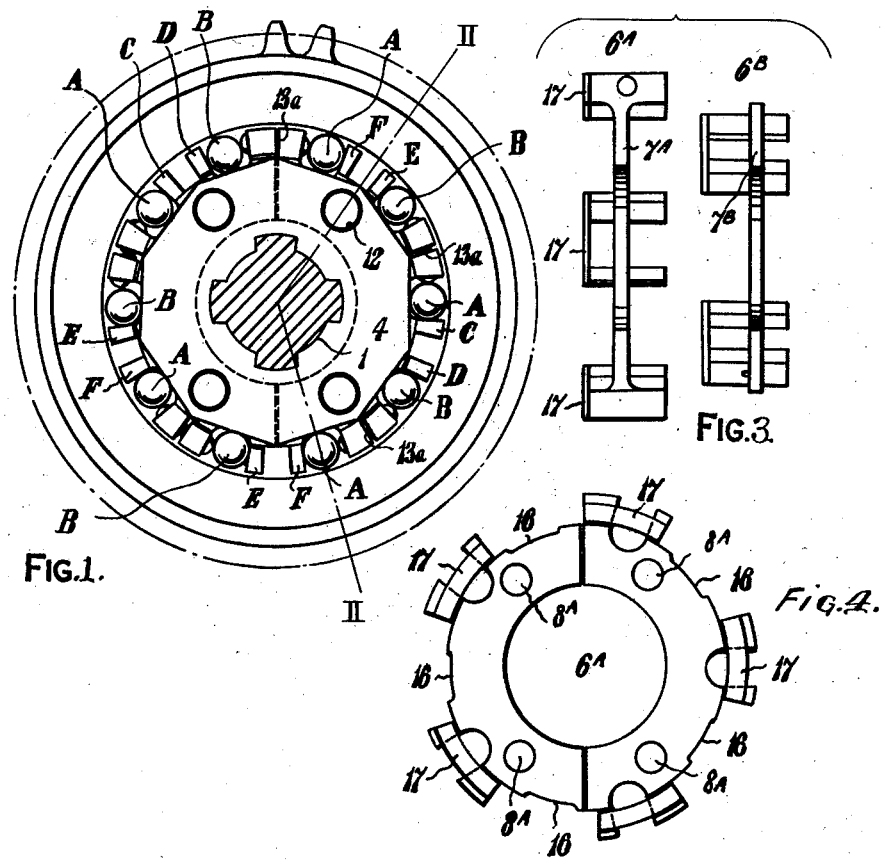
James Farley (Inventor)
pn. Sydney E. Page.
(Attorney).

Nov. 25, 1930.  J. FARLEY  1,782,605
TRANSMISSION MECHANISM
Filed April 14, 1927   2 Sheets-Sheet 2

Inventor.
James Farley
Per: Sydney E. Page
Attorney.

Patented Nov. 25, 1930

1,782,605

UNITED STATES PATENT OFFICE

JAMES FARLEY, OF HERTFORD, ENGLAND

TRANSMISSION MECHANISM

Application filed April 14, 1927, Serial No. 183,867, and in Great Britain April 23, 1926.

This invention relates to clutch transmission mechanisms and has more especial reference to friction clutches including wedging members disposed as abutments between adjacent faces of driving and driven elements.

The main objects of the invention are to provide a friction clutch of sufficiently small dimensions to permit of it being embodied in the gear box of a motor vehicle, and through which transmission through the driving and driven elements of the clutch may be readily interrupted and equally readily resumed in any relative positions of the driving and driven elements.

Another object of the invention is to provide for the positive transmission of power in both directions of rotation, while further objects of the invention will appear and be pointed out in the following description.

In clutch mechanism according to the invention having wedging members disposed between a polygonal member and a co-axial cylindrical face, a composite cage for the wedging members is provided having two parts, each part angularly movable relative to the other and each carrying a series of wedging members, resilient means being disposed between said cage parts urging the respective series of wedging members to abutment or coupling position between said polygonal member and said cylindrical face, one series of wedging members transmitting the drive in one direction of rotation and the other series in the opposite direction, so that a positive coupling is provided in whichever direction the effort is transmitted.

Registering means are associated with said cage parts for operating them to withdraw the wedging members to central location on the faces of the polygonal member for the purpose of interrupting transmission and such means may comprise taper pins engaging apertures in the cage parts and by effecting registration of the apertures in the adjacent parts causing said cages to move the wedging members against the effort of the resilient means into a position in which transmission is interrupted.

The invention will be further described with reference to the annexed drawings where a clutch according to the invention is shown embodied in a pinion such as might be used in the gear box of a motor vehicle, the clutch serving to control the transmission between the pinion and its shaft.

In said drawings:

Fig. 1 is an end view of the roller clutch between the shaft and pinion aforementioned, the parts being in uncoupled position with the registering device removed for the sake of clearness;

Fig. 3 shows an end view of the parts of the composite cage shown in Fig. 1;

Fig. 4 shows in face view one of said cage parts;

Figure 5:
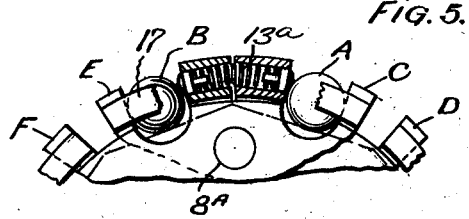
Fig. 5 is a detail of the friction clutch shown in Fig. 1 to an enlarged scale.

Referring now to the drawings the shaft is identified by the reference 1, and the pinion, which is loosely mounted thereon, by the reference 2, and for convenience of explanation the shaft 1 may be considered the driver and the pinion 2 the driven element.

The transmission mechanism, according to the invention, includes a cylindrical face 3 formed on the pinion 2 within which is disposed the polygonal member 4 fixed for rotation with the shaft and between the polygonal member and the aforesaid cylindrical face are a series of rollers mounted in a cage.

The cage is of a composite nature including two parts, one part 6A of which holds alternate rollers A and the other part 6B intermediate rollers B.

By moving a cage part relatively to the polygonal member 4, each roller controlled by the cage will be brought towards, or retracted from, a longitudinal edge of the polygonal member, and the construction is such that when brought towards a longitudinal edge the corresponding rollers all connect the cylindrical face 3 to the polygonal member and produce an abutment or positive drive from the shaft 1 through the polygonal member to the pinion 2.

In order to provide constraining means to hold at will the rollers of a cage part in uncoupling position, that is, free from the cylindrical face 3, each cage part is provided with a flange such as 7A, 7B, perforated as indicated at 8A, 8B respectively, for co-operation with registering pins included in a device for causing the required angular setting of the cage part.

Figure 2:
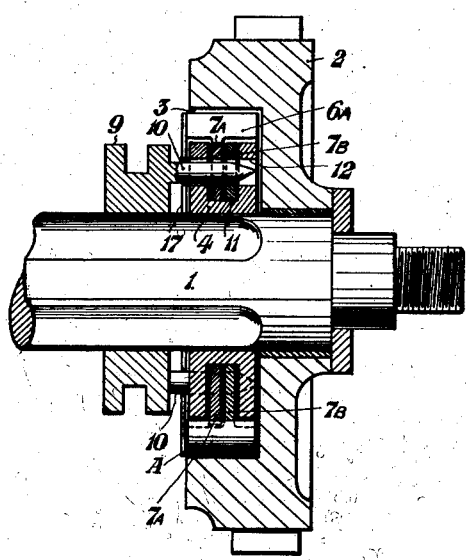
Fig. 2 is a section on the line II—II of Fig. 1.

The registering device may be rotatable with the polygonal member and include a reciprocal member 9, Fig. 2, carrying register pins 10 with tapered ends, which when moved up to the polygonal member, enter the perforations and by a wedging process the body of the pins fitting the perforations in the flanges 7A, 7B of the cage parts, cause the cage parts to come into that particular relative position with regard to the polygonal member, so as to maintain the rollers in substantially mid position of the faces of the polygonal member. In such a position the rollers are free of the cylindrical face 3 and there can be no transmission from the polygonal member to the pinion or vice versa. In order that the member 9 may be fixed with regard to the polygonal member 4, both are keyed on the shaft 1 but the member 9 is movable axially with regard to the polygonal member 4 by any suitable operating means.

In the construction shown the polygonal member is peripherally grooved transversely to its axis, as indicated at 11, Figs. 1 and 2, for the reception of internal perforated flanges 7A and 7B formed on the cage parts 6A and 6B respectively, and in order to permit the passage of the register pins 10 to the perforations in the internal flanges aforesaid, the polygonal member is perforated parallelly to its axis as indicated at 12.

For purposes of assembling such a construction, the cage parts are divided preferably into two similar halves. One half of the cage, part 6A, is shown in Fig. 3 (i. e. that half on the left as viewed in Fig. 1) and also the corresponding half of the cage, part 6B, the cage parts being displaced one from the other for sake of clearness, it being understood that in operation the flanges 7A and 7B are in substantial abutment when located within the peripheral groove 11 of the polygonal member, as clearly shown in Fig. 2.

A complete cage part 6A is shown in face view in Fig. 4, which, if compared with Fig. 1, shows clearly the intermeshing of the cage parts to form a composite whole, the cage part 6A holding the rollers A and the cage part 6B the rollers B.

In the position shown in Fig. 1, the register pins, not shown, are assumed to be engaging the apertures 8A and 8B of the cage parts, these apertures are therefore in register with the apertures 12 of the polygonal member, and in this position the cage parts have been moved relative to each other and to the polygonal member in order to hold the rollers in mid position on the corresponding faces thereof; in this position springs 13$^a$ disposed between pairs of rollers B, A, are compressed. Preferably, as shown these springs operate through studs with convex heads to press against the contiguous rollers B, A. When the register pins are withdrawn from the cage parts, the springs 13$^a$ are immediately effective to push the rollers apart to transmitting position.

Figure 6:
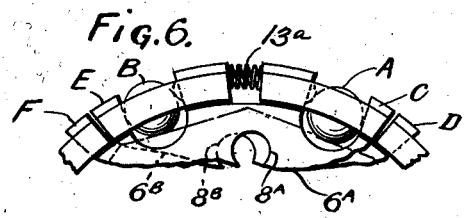
Fig. 6 is a similar view to Fig. 5 but showing the parts in transmission position.

Fig. 5 shows the arrangement of the springs, rollers and cages when in the inoperative position, and Fig. 6 the springs expanded and the rollers operative.

The movement of the rollers under the influence of the springs impels the cage parts to move relatively each to the other; consequently their corresponding apertures 8A and 8B are displaced accordingly as clearly shown in Fig. 6.

In order to prevent two adjacent rollers A and B being wedged against an edge of the polygonal member between them and the cylindrical face, with such force as to lock them there against release by use of the register pins, the cage parts are constructed so as to limit the movement permitted between them by abutting one against another when the desired travel of rollers towards the edges of the polygonal member has been effected.

Comparing Fig. 5 and Fig. 6 it will be noted that when the register pins are removed the lug C on the cage part 6A is moved into abutment with the lug D on the cage part 6B. This same relative movement also causes the abutment of the lug E on the cage part 6B and the lug F on the cage part 6A. In other words, if each pair of lugs between which a roller is lodged on one cage part be considered with the adjacent corresponding pair of lugs on the other cage part, it will be seen that the adjacent lugs of the pair carry between them the spring 13$^a$ pressing against the rollers, which tends to separate them when the register pins have been removed, while the outside lugs of the pair act as abutments when the cage part moves.

As clearly shown with regard to the cage part 6A in Fig. 4, each cage part must have peripheral recesses 16 between each pair of lugs to permit the passage of the rollers held by the other cage part.

In this construction the ends of the lugs terminating on the side of the polygonal member juxtaposed to the member 9 are provided with short retaining flanges 17 for the purpose of retaining the rollers within the pinion member. These flanges are not shown in Fig. 1 for sake of clearness.

Although in the embodiment illustrated the clutch is shown included in a pinion and operable to uncouple the pinion from its shaft, the pinion may be readily replaced by a boss mounted on a driven shaft in alignment with the driving shaft, the operation of the clutch in both cases being the same, and providing for the uncoupling and recoupling of the driving and driven members in any relative angular position.

Further, in the drawings the polygonal member has been shown as a decagon, and it has been found in practice that a ten-sided polygon presents two distinct advantages, firstly a good angle for jamming the rollers is obtained, and secondly the movement of the cage in relation to the polygonal member is so small as to be readily actuated by control means comprising the register pins aforesaid, although if desired polygonal members having other numbers of operative faces may be employed.

What I claim is:—

1. In clutch mechanism including wedging members disposed between a polygonal member and a coaxial cylindrical face, a free composite cage for the wedging members whereby transmission may be effected whether the polygonal or the coaxial cylindrical face is operating as a driver, said composite cage including two parts angularly movable relative to each other, a series of wedging members mounted in each part, and registering means rotatable with said polygonal member for securing the cage parts with the wedging members free of the said cylindrical face whereby transmission is interrupted.

2. In clutch mechanism including wedging members disposed between a polygonal member and a coaxial cylindrical face, a free composite cage for the wedging members whereby transmission may be effected whether the polygonal or the coaxial cylindrical face is operating as a driver, said composite cage including two parts angularly movable relative to each other, a series of wedging members mounted in each part, and each part being spring urged to direct its wedging members to coupling position, and registering means rotatable with said polygonal member for securing the cage parts with the wedging members free of the said cylindrical face whereby transmission is interrupted.

3. In clutch mechanism including wedging members disposed between a polygonal member and a coaxial cylindrical face, a free composite cage for the wedging members whereby transmission may be effected whether the polygonal or the coaxial cylindrical face is operating as a driver, said composite cage including two parts angularly movable relative to each other, a series of wedging members mounted in each part, registering means rotatable with said polygonal member for securing the cage parts with the wedging members free of the said cylindrical face whereby transmission is interrupted, and distance pieces between said cage parts disposed to limit the relative movement of the cage parts when released by the registering means, and prevent jamming of adjacent wedging members between an edge of the polygonal member intermediate of them and the cylindrical face.

4. In clutch mechanism including wedging members disposed between a polygonal member and a coaxial cylindrical face, a free composite cage for the wedging members whereby transmission may be effected whether the polygonal or the coaxial cylindrical face is operating as a driver, said composite cage including two parts angularly movable relative to each other, a series of wedging members mounted in each part, and each part being spring urged to direct its wedging members to coupling position, registering means rotatable with said polygonal member for securing the cage parts with the wedging members free of the said cylindrical face whereby transmission is interrupted, and distance pieces between said cage parts disposed to limit the relative movement of the cage parts when released by the register means, and prevent jamming of adjacent wedging members between an edge of the polygonal member intermediate of them and the cylindrical face.

5. In clutch mechanism including wedging members disposed between a polygonal member and a coaxial cylindrical face, a free composite cage for the wedging members whereby transmission may be effected whether the polygonal or the coaxial cylindrical face is operating as a driver, said composite cage including two parts, each angularly movable relatively to the other, one of said cage parts holding alternate wedging members and the other cage part the intermediate wedging members, and registering means rotatable with said polygonal member for securing the cage parts with the wedging members free of the said cylindrical face, whereby transmission is interrupted.

6. In clutch mechanism including wedging members disposed between a polygonal member and a coaxial cylindrical face, a free composite cage for the wedging members whereby transmission may be effected whether the polygonal or the coaxial cylindrical face is operating as a driver, said composite cage including two parts, each angularly movable relatively to the other, one of said parts holding alternate wedging members and the other part the intermediate wedging members, registering means rotatable with said polygonal member for securing the cage parts with the wedging members free of the said cylindrical face, whereby transmission is interrupted, and distance pieces between said cage parts disposed to limit the relative movement of the cage parts when released by the register pins, and prevent jamming of adjacent wedging members between an edge of the polygonal member intermediate of them and the cylindrical face.

7. In clutch mechanism including wedging members disposed between a polygonal member and a coaxial cylindrical face, a free composite cage for the wedging members whereby transmission may be effected whether the polygonal or the coaxial cylindrical face is operating as a driver, said composite cage including two parts, each angularly movable relatively to the other, one of said parts holding alternate wedging members and the other part the intermediate wedging members, registering means rotatable with said polygonal member for securing the cage parts with the wedging members free of the said cylindrical face whereby transmission is interrupted, and distance pieces integral with each cage part to limit the relative movement of the cage parts when released by the register pins, and prevent jamming of adjacent wedging members between an edge of the poylgonal member intermediate of them and the cylindrical face.

8. In clutch mechanism including wedging members disposed between a polygonal member and a coaxial cylindrical face, a free composite cage for the wedging members whereby transmission may be effected whether the polygonal or the coaxial cylindrical face is operating as a driver, of the coaxial member, said polygonal member being perforated axially and peripherally grooved transversely to its axis, said composite cage including two parts each angularly movable relatively to the other, one of said parts holding alternate wedging means and the other part intermediate wedging means, an internal perforated flange for each cage part formed to take into the peripheral groove on the polygonal member, an axially movable member fixed for rotation with the polygonal member, tapered registering pins on the axially movable member constructed to pass through the perforations in the polygonal member, enter the perforations of the flanges of the cage parts, move said parts to positions holding the wedging means free of said cylindrical face whereby transmission is interrupted, distance pieces between said cage parts disposed to limit the relative movement of the cage parts when released by registering pins and prevent jamming of adjacent rollers between an edge of the polygonal member intermediate of them and the cylindrical face, and a resilient means engaging said wedging members disposed to push said wedging members to transmission position immediately after the cage parts are released from the register pins.

In testimony whereof I affix my signature.

JAMES FARLEY.